United States Patent [19]

Littlejohn et al.

[11] Patent Number: 4,575,426

[45] Date of Patent: Mar. 11, 1986

[54] METHOD AND APPARATUS EMPLOYING OLEOPHILIC BRUSHES FOR OIL SPILL CLEAN-UP

[75] Inventors: Lee A. Littlejohn, Houston; Keith F. Kruk, Sugar Land; Robert E. Williams; Thomas F. Bailey, both of Houston, Tex.

[73] Assignee: Exxon Production Research Co., Houston, Tex.

[21] Appl. No.: 622,326

[22] Filed: Jun. 19, 1984

[51] Int. Cl.$^4$ ............................................. E02B 15/04
[52] U.S. Cl. .................................. 210/671; 15/21 D; 15/340; 134/10; 134/21; 134/104; 210/242.4; 210/924
[58] Field of Search ................. 134/6, 10, 21, 104; 210/671, 680, 691, 693, 241, 242.4, 924; 15/21 D, 340

[56] References Cited

U.S. PATENT DOCUMENTS

| 3,314,545 | 4/1967 | Grabbe et al. | 210/242 |
|---|---|---|---|
| 3,617,555 | 11/1971 | Ginsburgh et al. | 210/693 |
| 3,617,556 | 11/1971 | Cole et al. | 210/693 |
| 3,640,394 | 2/1972 | Brill et al. | 210/396 |
| 3,669,275 | 6/1972 | Downs | 210/242 |
| 3,670,896 | 6/1972 | Hale et al. | 210/242 |
| 3,693,805 | 9/1972 | Tillett | 210/519 |
| 3,702,297 | 11/1972 | Maksim | 210/924 |
| 3,727,766 | 4/1973 | Horne et al. | 210/242 |
| 3,786,779 | 1/1974 | Brunel et al. | 15/77 |
| 3,962,083 | 6/1976 | Goldman | 210/924 |
| 4,006,086 | 2/1977 | Tsunoi | 210/242 |
| 4,172,036 | 10/1979 | Morris | 210/242.4 |
| 4,224,162 | 9/1980 | Ayroldi | 210/242 |
| 4,264,450 | 4/1981 | Ayers et al. | 210/671 |
| 4,336,137 | 6/1982 | Byers | 210/242.3 |
| 4,340,486 | 7/1982 | Swanson | 210/693 |
| 4,349,439 | 9/1982 | Lundin | 210/242.3 |
| 4,356,089 | 10/1982 | Challener et al. | 210/242.4 |
| 4,360,429 | 11/1982 | Morris | 210/242.3 |
| 4,432,874 | 2/1984 | Lundin | 210/242.4 |
| 4,446,636 | 5/1984 | Weinert | 37/54 |
| 4,477,287 | 10/1984 | Kush et al. | 134/21 |
| 4,492,001 | 1/1985 | Hedrenius | 134/21 |

FOREIGN PATENT DOCUMENTS 1136556 11/1982 Canada .
0113188 11/1984 European Pat. Off. .

OTHER PUBLICATIONS

Sittig, M., *Oil Spill Prevention and Removal Handbook*, Noyes Data Corp., Park Ridge, New Jersey (1974) pp. 248-364 & 450-454.

*Primary Examiner*—Ivars Cintins
*Attorney, Agent, or Firm*—Karen T. Burleson

[57] ABSTRACT

A method and apparatus for removing oil from the surface of a body of water, subtidal seafloor, a riverbed, a shoreline or a beach are disclosed. The method employs a sweeping action of oleophilic bristles comprising at least one brush to remove oil from such a surface and a suction means to remove oil from the bristles. The apparatus comprises one or more oleophilic bristled brushes connected to a support means. The brushes are positioned so that they have a lower portion in contact with the oil and an upper portion above the oil. A motor means moves the brushes so that the oil is drawn into the brushes. A suction means, such as an air conveyor system, removes the oil from the brushes.

26 Claims, 6 Drawing Figures

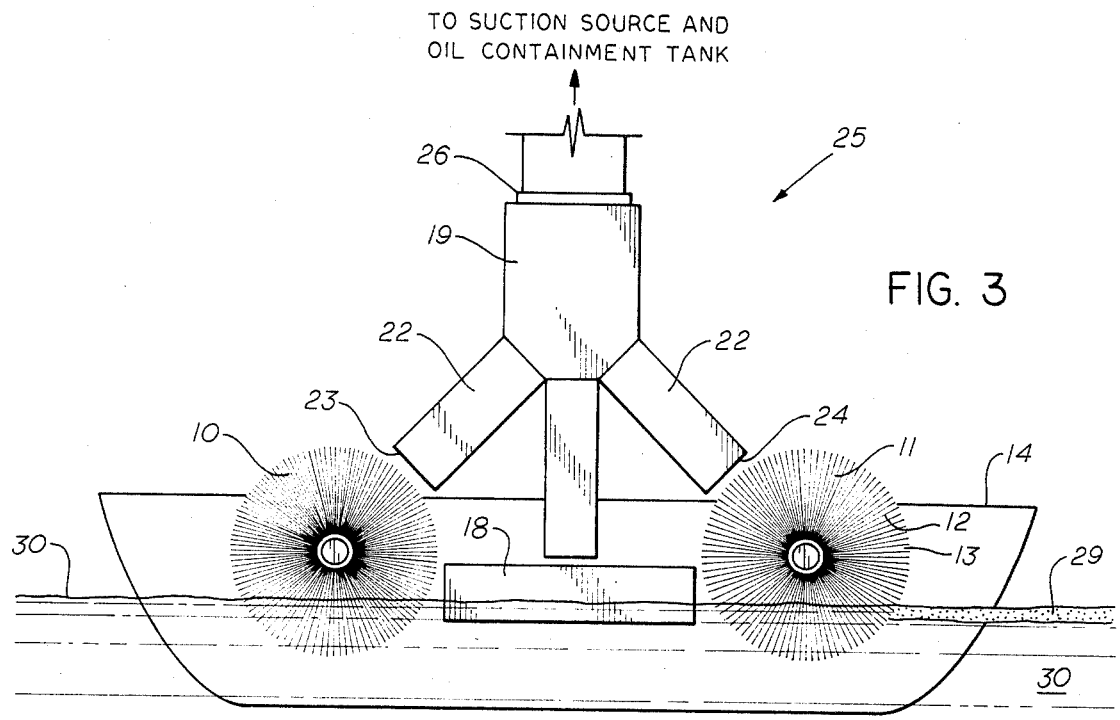
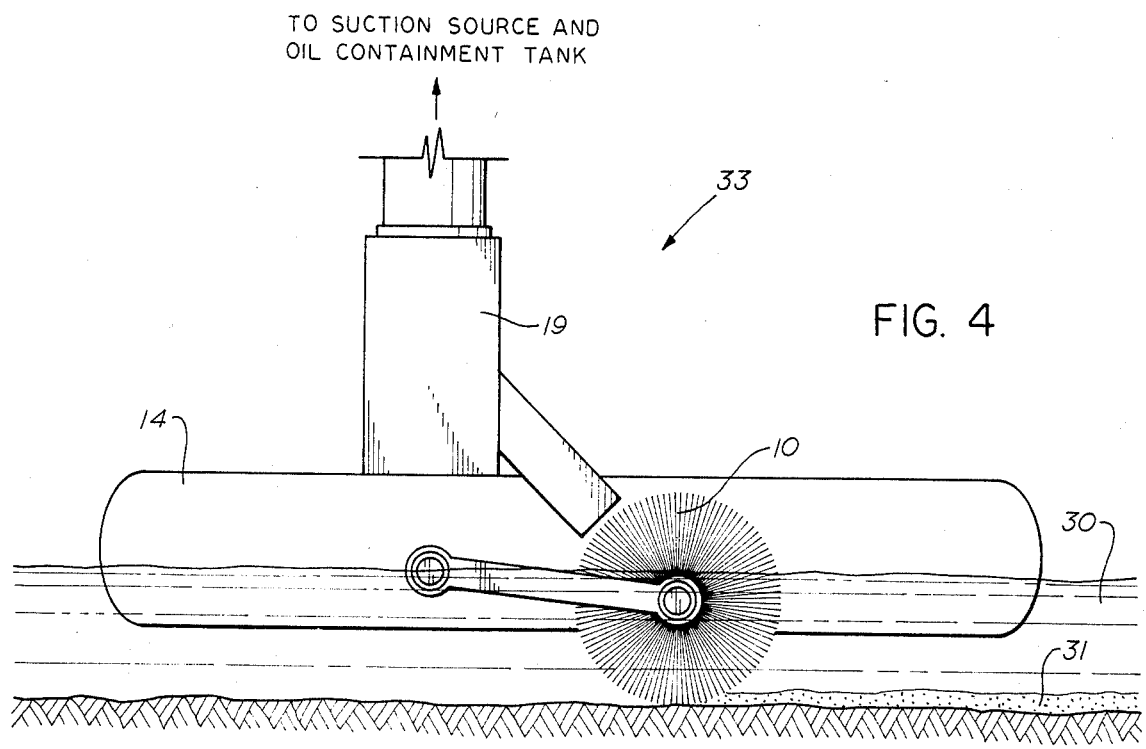

METHOD AND APPARATUS EMPLOYING OLEOPHILIC BRUSHES FOR OIL SPILL CLEAN-UP

FIELD OF THE INVENTION

This invention relates to an apparatus and method for removing oil from a surface that is not oleophilic. More particularly, this invention relates to an apparatus and method for removing oil from the surface of water, from the surface of a subtidal sea floor or riverbed, and from a shoreline or beach.

BACKGROUND OF THE INVENTION

With the increase of tanker transport of oil by sea and exploration and production of oil offshore, particularly in areas with especially hazardous marine conditions such as those near the North Slope of Alaska and in the Arctic Ocean, the potential for oil spillage at sea has increased. Much attention has been given recently to preventing and reducing pollution from such oil spillage.

Spilled oil at sea tends to float in slicks on the surface of the sea water. Near shorelines, wave action can cause oil on the water's surface to mix with sand on the shore. Some such oil may remain deposited on the beach. Other oil mixed with sand may be taken by wave action back to sea. Back at sea, such oil coated sand may sink to the subtidal sea floor near the shoreline. Removing floating, deposited or submerged oil is generally considered the most desirable way of combating pollution by the oil.

Many mechanical devices, generally known as skimmers, for such removal or collection of oil floating on the surface of water have been proposed. Relatively few, however, have been found to be commercially practicable. Of those skimmers available, most are limited to operation in one type situation only, for example, removing only less viscous oils on calm seas.

A number of factors are known to affect the effectiveness of skimmers in collecting oil. Such factors include viscosity of oil spilled, the location and thickness of the oil slick, and water conditions, including wave height and the presence of debris or ice in the water.

Commonly available skimmers that are generally known as weirs, centrifugal devices, and suction devices employing vacuum pumps require calm waters and relatively thick oil slicks for efficient removal of oil from the surface of water. Otherwise, they collect substantially more water than oil. Weirs and suction devices employing vacuum pumps are also susceptible to clogging with debris or ice.

Sorbent surface skimmers are not as sensitive to wave height and water currents as are weirs, centrifugal devices and suction devices. Thus, sorbent surface skimmers are generally preferred for use in removing oil slicks at sea.

There are a number of basic kinds of sorbent surface skimmers known—drum, disc, belt, and rope—all of which generally operate by absorption or adhesion of oil on a surface, usually oleophilic, which is then cleaned off, usually by squeezing or scraping. Of the sorbent surface skimmers commonly available, none are general purpose that can operate on water, a sea floor or riverbed, and a shoreline or beach.

Drum type skimmers generally do not have sufficient surface area to collect oil efficiently. Disc and rope type skimmers have more surface area than drum type skimmers, but they can leave narrow streaks of oil where their surfaces do not touch or overlap, particularly if the oil is viscous, as in the Arctic. The squeezing and scraping means of removing oil from the devices are also generally too slow for efficient use of the devices with viscous oil such as that encountered in oil spills in the Arctic. With very viscous oil, the sorbent surfaces or the squeezing or scraping means may even become gummed. Drum, disc and belt type skimmers are also very susceptible to damage by debris or ice floating in the water.

No available skimmer seems ideally suited for the conditions of the Arctic, where the sea waters may contain ice and be less than calm, and the oil slick may be very viscous. There is a substantial need for a skimmer that can be effectively used in the Arctic. There is also a need for versatile skimmers or devices capable of removing various types of oils under various types of conditions, whether the oil is floating on water or deposited on a seafloor or riverbed, shoreline or beach.

A number of mechanical devices are known for removal of oil from a shoreline or beach. The operation of such devices available, however, is limited by the beach topography. For example, some sandy beaches may not be hard enough to support construction equipment commonly used for beach cleaning. Pebbly beaches are particularly difficult to clean because oil gets into crevices between the pebbles, and graders or scrapers commonly used for beach cleaning are unstable on such a surface. Front-end loaders or bulldozers that may be used on a pebbly surface must remove substantial amounts of the beach surface to clean up oil on the beach. Such removal of much of the surface can disrupt normal beach processes. To prevent erosion, the removed surface has to be replaced. There is a need for versatile beach cleaners that can remove various types of oils deposited on various types of beach surfaces while minimizing removal of the sand or pebbles naturally comprising the beach.

There is no device generally available commercially that is satisfactory for removing submerged oil from a subtidal sea floor or riverbed.

SUMMARY OF THE INVENTION

The present invention provides a method and apparatus for removing oil from a surface that is not oleophilic, such as water, a subtidal sea floor or riverbed, a shoreline or a beach. Briefly, the method of the invention employs a sweeping of such a surface with flexible, oleophilic bristles comprising at least one brush to pick up the oil from the surface and removal of the oil from the bristles by suction. The apparatus of the invention is suitable for use in carrying out the method of the invention.

All references to "brush" herein shall be understood to mean brush or brushes, unless otherwise specifically stated, and all references to "brushes" herein shall be understood to apply as well to a single brush unless otherwise specifically stated.

The apparatus of the invention comprises at least one brush, having flexible, oleophilic bristles, connected to a support means. The brush is preferably cylindrical in shape. The support means is preferably capable of floating for easy use at sea and also preferably suitable for use on land. The support means also allows the brush to be positioned so that it has a lower portion in contact with the oil and an upper portion above the oil. Preferably, the brush is removable so that different size and type brushes may be used for different types of situations.

A motor means rotates the brush, or moves it back and forth, so that the oil is drawn into the brush by the brush's action and its oleophilic bristles. When the apparatus has more than one brush, the brushes may sweep in the same or in opposite directions, at the same or at different speeds, and need not be the same size.

A suction means for removing oil from the brush is positioned adjacent to the upper portion of the brush. Such suction means is preferably an air conveyance system.

BRIEF DESCRIPTION OF THE DRAWINGS

FIG. 3 is a side view of the apparatus in FIG. 1 cut along line 3.

FIG. 4 is side view of one embodiment of the apparatus of this invention for removing oil from the surface of a subtidal seafloor or riverbed.

DESCRIPTION OF THE PREFERRED EMBODIMENT

The present invention provides a general purpose apparatus and method for removing oil from surfaces that are not oleophilic, particularly the surface of a body of water, a subtidal sea floor or riverbed, or a shoreline or beach. The invention is effective in removing a wide range of oils, from the very viscous, even tar balls, to those with extremely low viscosity, such as diesel oil.

Briefly, the method employs a sweeping action of oleophilic bristles comprising at least one brush to remove oil from the surface of water or land and a suction means to remove oil from the bristles. The method may best be applied by employing the apparatus of this invention.

At sea, use of the apparatus is not limited to relatively calm waters free of debris. The apparatus is not easily damaged or clogged by floating debris or ice and it can efficiently remove even very viscous oil from water containing ice. These characteristics make the apparatus particularly suited for use in the Arctic where no skimmers currently commercially available are completely satisfactory.

On land, the apparatus is not easily damaged or clogged by debris or rocks. It can remove oil efficiently from surfaces comprised of pebbles and rocks as well as wet or dry sand.

The apparatus has a high oil pick-up rate, even at sea in waves higher than 60 cm and currents stronger than 30 cm/sec (0.6 knots). Moreover, it recovers very little water with the oil at sea, and it removes relatively little sand and few rocks or pebbles with the oil on a shoreline, beach or subtidal seafloor or riverbed.

Figure 2:
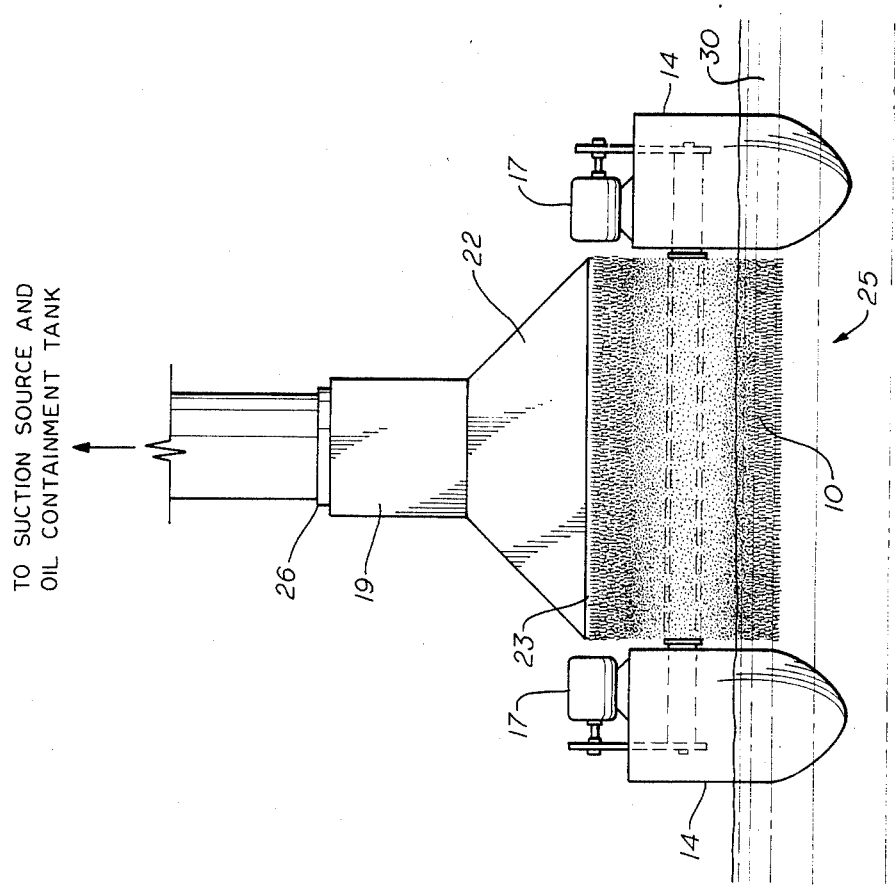
FIG. 2 is an end view of the apparatus in FIG. 1.
Figure 1:
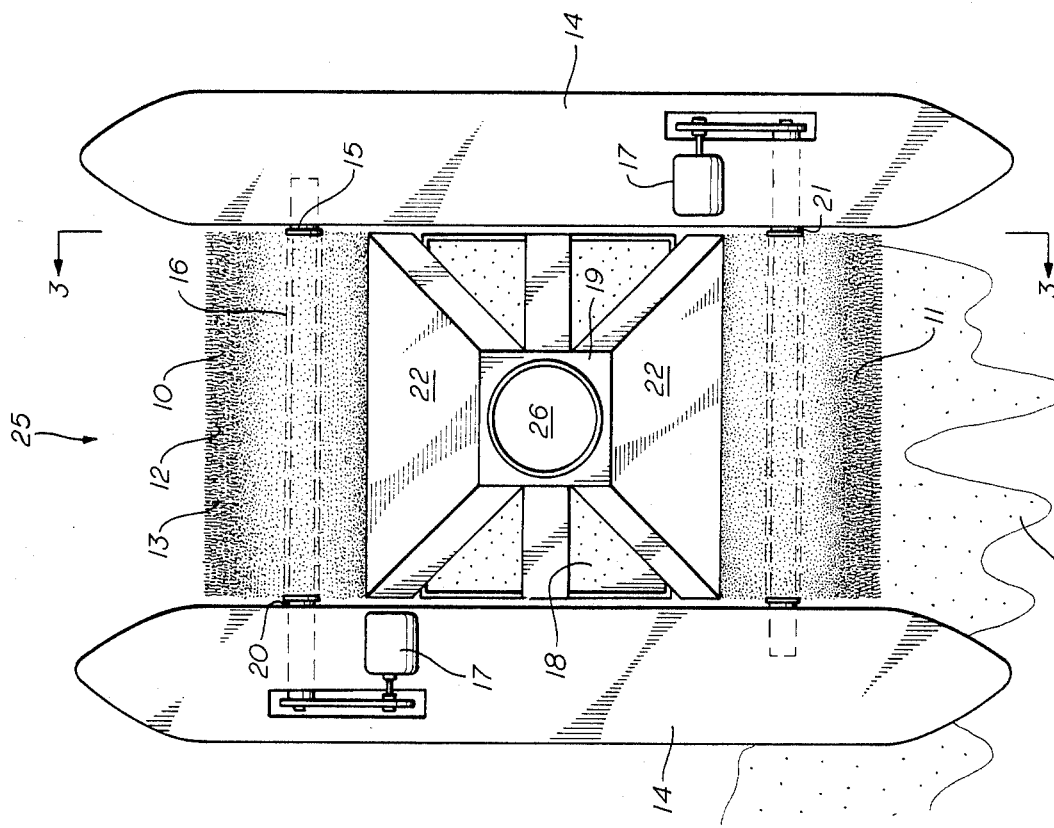
FIG. 1 is a top view of one embodiment of the apparatus of this invention for removing oil from the surface of a body of water.

FIGS. 1, 2 and 3 illustrate one embodiment of the present invention for removing oil from the surface of a body of water. This apparatus 25 has one or more brushes, but preferably two cylindrically shaped brushes 10 and 11 attached to a support means 14. Those skilled in the art will know how to attach the brushes to such support means. Such attachment may be achieved in a number of ways, including employment of a shaft means 20 and 21 as depicted in FIG. 1. However the brushes are attached to the support means, it is preferable that they be easily removable from the apparatus.

The brushes 10 and 11 are preferably positioned parallel to each other and perpendicular to and between the support means 14, in catamaran style. The support means 14 floats on the surface of the water. The juncture 15 of the support means 14 and the brushes 10 and 11 is preferably adjustable so that the brushes may be easily placed in the position desired. The lower portion of the brushes 10 and 11 should lie in the water; the upper portion of the brushes 10 and 11 should be above the surface of the water. Preferably, the lower most portion of the brushes 10 and 11 will lie lower in the water than the depth of the oil slick 29 that the apparatus 25 is to remove.

Although preferable, it is not necessary that the brushes 10 and 11 be the same size so long as the apparatus 25 is balanced so that the support means 14 is able to float on the surface of the water 30.

Each brush is comprised of bristles or fibers 12 attached to a means for holding the bristles in place 16. In a cylindrical brush, such holding means will be positioned at the brush's center. Those skilled in the art will know how to attach the bristles 12 to the holding means 16.

Preferably, the bristles 12 of the brushes 10 and 11 are shaped and positioned on the means for holding the bristles 16 such that the brushes 10 and 11 have a cylindrical shape. The bristles 16 need not be comprised of the same type of bristles on the same brush 10 or 11 or on each brush 10 and 11 so long as the bristles are comprised of oleophilic materials.

The bristles 12 may be comprised of any number of oleophilic materials. Examples of materials suitable for comprising the bristles of the brushes for use in this invention are polyolefins such as polyethylene and polypropylene, polyamides, polyesters, vinyls, acrylics, and any other fiber-forming polymers or plastics known to the textile art for use as fibers and filaments. Bristles of metallic substances, such as aluminum or stainless steel, may also be used. Generally, however, bristles made from fiber-forming polymers or flexible plastics are preferred because they tend to be more flexible and less susceptible to damage when bent than metallic bristles.

The bristles 12 should be flexible and should not break easily when bent. Preferably, the bristles 12 will be strong, resilient, and able to maintain flexibility at temperatures ranging from well below freezing, for example, $-30°$ F. as is common in Arctic waters, to as high as about $90°$ F., as is sometimes found in tropical waters.

The shape of the bristles 12 will be longer than wide and either rounded or flat, as is common for a brush. The actual length and diameter or width of the bristles and the bristles' stiffness and spacing or closeness with respect to each other, will depend on the type of oil the apparatus is to remove. Fine, closely spaced bristles are preferred for less viscous oil, such as diesel oil. More widely spaced, stiffer bristles or fibers are preferred for very viscous oils, such as those encountered in oil spills in Arctic waters. Generally, it is preferable to control stiffness with length and/or diameter or width of the bristles, rather than bristle composition, since the bristles or fibers need to be made of material that is flexible and not easily damaged when bent. Generally the shorter the bristles, the stiffer the brush will be.

A motor means 17 for rotating the brushes 10 and 11 is coupled to the support means 14 and connected to the shaft means of the apparatus 25 in FIGS. 1, 2 and 3. The rotation of the brushes 10 and 11 and the resulting sweeping action of the brushes 10 and 11, combined with the oleophilic character of the bristles 12 of the brushes, cause the oil comprising the oil slick 29 in the vicinity of the brushes 10 and 11 to adhere to the bristles 12 and fill the interstitial spaces 13 between the bristles 12, and thus be picked up by the brushes 10 and 11.

Preferably, the brushes 10 and 11 will rotate in opposite directions toward each other. This will cause oil moved by hydrodynamic force but not picked up by the brushes to be deposited between the brushes in a sump area 18 of the apparatus 25. However, apparatus 25 may also be made so that the brushes 10 and 11 will rotate in the same direction or in opposite directions away from each other and the sump area 18. For increased versatility, the apparatus 25 may be made so that the brushes may rotate independently of each other.

The rotation speed of the brushes 10 and 11 is preferably adjustable so that it can be optimized for the existing operating conditions. Generally, the rotation speed which will maximize the pickup rate of the oil is preferred. The thicker and less viscous the oil and the more calm the sea, the faster the oil will flow into the brushes and hence the faster the oil may be picked up. Preferably, the rotation rate of the brushes will be such that their pick up rate will be approximately equal to the rate of flow of oil into the brushes. When increased rotation rates are accompanied by increased water pickup with the oil, the practical optimum brush rotation speed is the highest speed at which the brushes can rotate before collection of water with the oil becomes excessive for the capacity of the oil containment tank. Usually, pickup of not more than ten percent water with the oil is preferred. The oil/water pickup rate may be estimated, for example, by observing the relative amounts of oil and water in the oil containment tank or may be determined, for example, by an electronic or optical sensor in a flow line to the oil containment tank.

Turbulence and head waves, caused by rotation of drum and belt type skimmers and known to problematically drive oil away from such skimmers, are not substantial problems with the apparatus of the present invention, even at relatively fast rates of rotation of the brushes. The brushes of this invention do not cause gross turbulence and head waves in water to the extent that drums or belts do. Moreover, because of their greater surface area and sweeping bristles action, the brushes of this invention tend to better "catch" the oil than sorbent surfaces of drum, disc, or belt type skimmers. Particularly, viscous, semi-solid water in oil emulsions that exist in oil slicks and that do not tend to flow toward an oleophilic surface to the extent that oil does are more easily "caught" by brush bristles or fibers of this invention than by sorbent surfaces on drum, disc, or belt type skimmers. Also, such drum, disc, and belt type skimmers known in the art are generally very susceptible to damage by ice and debris in the water, while the brushes of this invention are not.

Oleophilic rope type skimmers with "brushlike" surfaces on loops known in the art also exhibit such a "catching" advantage with water in oil emulsions. However, the placement of the apparatus of this invention can be more easily controlled than the placement of rope type skimmers, and the brushes of this invention provide a continuous surface that does not leave thin, narrow streaks of oil which are difficult to remove as are commonly left by rope type skimmers.

As the brushes 10 and 11 of apparatus 25 rotate, the bristles 12 to which oil has adhered are brought above the surface of the water. A suction means 19 adjacent to the upper portion of the brushes 10 and 11 quickly, by suction, removes the oil from the surfaces of the bristles 12 and from the interstitial spaces 13 between the bristles. The oil is then usually delivered to a collection or containment tank. The same suction means 19 or a different suction means may also remove oil from the sump area 18.

The suction means 19 of this invention is preferably an air conveyor system. The part of the system actually on the apparatus 25 need only be a suction plenum 22. The engine or other source of the suction may be with the oil collection tank or elsewhere on a nearby boat or on-shore, so long as there is a suction plenum connection 26 between the apparatus 25 and the source of the suction.

Although an air conveyor system may be considered a type of vacuum device, it does not actually depend on a high vacuum to remove the oil from the brushes 10 and 11. It depends on a high velocity stream of air, typically 100 or more miles per hour, to entrain and convey to the collection tank the oil and any accompanying water, debris, and/or ice on the brushes 10 and 11. In operation, air rushes radially into the the suction plenum 22 and increases in velocity rapidly as it approaches the plenum openings 23 and 24. The rushing air will entrain almost any liquid, semi-solid or solid particles in its path and lift them into the suction plenum 22 in much the same way that a tornado lifts material into its vortex. Hence, the suction means 19 is able to remove oils with a wide range of viscosity and is not easily clogged with debris and ice. The suction plenum 22 should, however, be wide enough to accommodate ice chunks the size of which the brushes 10 and 11 might reasonably be able to pick-up from the surface of the water 30. A suction plenum approximately 6 to 8 inches in diameter would be sufficiently large for most applications of the invention. In use of the invention in Arctic environments, the rapid movement of air with the suction that entrains the oil, and ice if any that may occur, also prevents accumulation of ice or debris in the system's vacuum lines which could plug them. Vacuum line freezing is a common problem with known skimmers employing conventional vacuum pump systems in the Arctic.

The suction plenum openings 23 and 24 should be respectively positioned adjacent to the upper portions of the brushes 10 and 11, but preferably not touching the brushes 10 and 11. To minimize intake of water, the suction plenum openings 23 and 24 should preferably be placed as high above the water's surface 30 as possible and still be adjacent to the upper portions of the brushes 10 and 11. However, to maximize intake of oil, the suction plenum openings 23 and 24 should preferably be placed as near the water's surface as possible, and still be adjacent to the upper portions of the brushes 10 and 11, so that oil adsorbed on the bristles may be easily removed before gravity can cause the oil to flow along the bristles into the brush's interior. Therefore, there will be an optimum position of the plenum openings 23 and 24 with respect to the brushes and the surface of the water that will provide the largest amount of oil recovery possible while minimizing recovery or intake of water. This optimum position will vary with the viscosity of the oil being removed and the wave height of the water. Generally, the more viscous the oil and the higher the wave height, the higher the plenum openings should be. Suction plenum openings of an air conveyance system are preferably never beneath the water's surface.

If the suction means is an air conveyor system, it should preferably not be operated near flames, sparks, static electricity, or other ignition sources since finely divided oil droplets in air may tend to be flammable.

The apparatus of this invention may be used in conjunction with oil containment devices such as booms. Booms may even be attached to the apparatus. Such attachment may increase the rate at which the apparatus can encounter floating oil.

FIG. 4 illustrates an embodiment of this invention for removing submerged oil 31 from the surface of a subtidal sea floor 32 or riverbed. The design and operation of the apparatus 33 is basically the same as described above for the apparatus 25, an embodiment for removing oil from the surface of water. Use of an air conveyor suction means, as preferred, requires that the upper portions of the brush 10 should extend above the surface of the water 30. The lower portion of the brush 10 should extend into the submerged oil 31. Such submerged oil may also contain sand. Hence, with this embodiment, employing an air conveyor suction means, the diameter of the brushes should be greater than the water depth.

Figure 5:
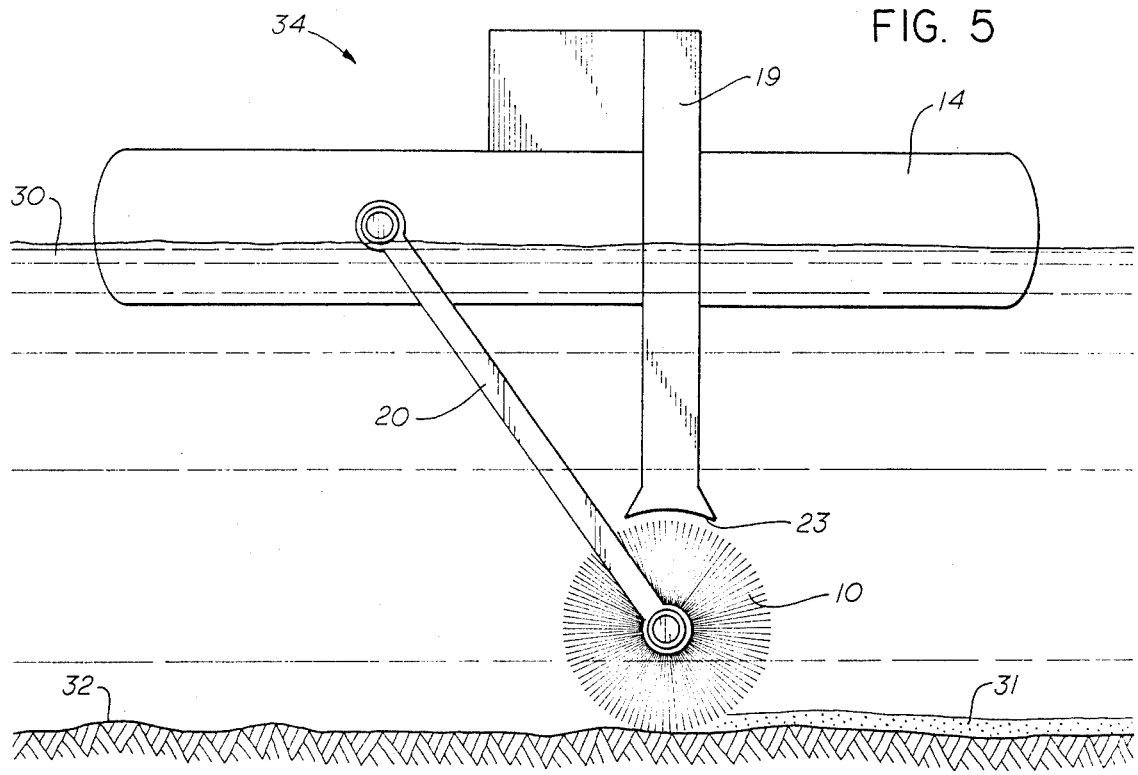
FIG. 5 is a side view of another embodiment of the apparatus of this invention for removing oil from the surface of a subtidal seafloor or riverbed.

The apparatus of this invention can be applied to remove submerged oil from water depths greater than the brush height or diameter if a suction means that can be submerged is used. In such an embodiment, as illustrated in FIG. 5, the support means 14 of the apparatus 34 will float on the surface of the water 30 and will be connected to at least one brush 10. The support means 14 will not, however, necessarily be directly adjacent to the brush 10 since the shaft means 20 which connects the brush to the support means 14 or other juncture of the brush to the support means will be adjustable to the extent as to allow the brush 10 to extend completely below the support means 14 to reach the submerged oil 31 on the subtidal sea floor 32. The upper portion of the brush will extend above the oil but not necessarily above the surface of the water; the lower portion of the brush will extend into the oil. The suction plenum opening 23 will lie adjacent to the upper portion of the brush 10. The suction means 19, however, must be one than can be used under water, such as a water pump. An air conveyor system can not be used in this embodiment.

Figure 6:
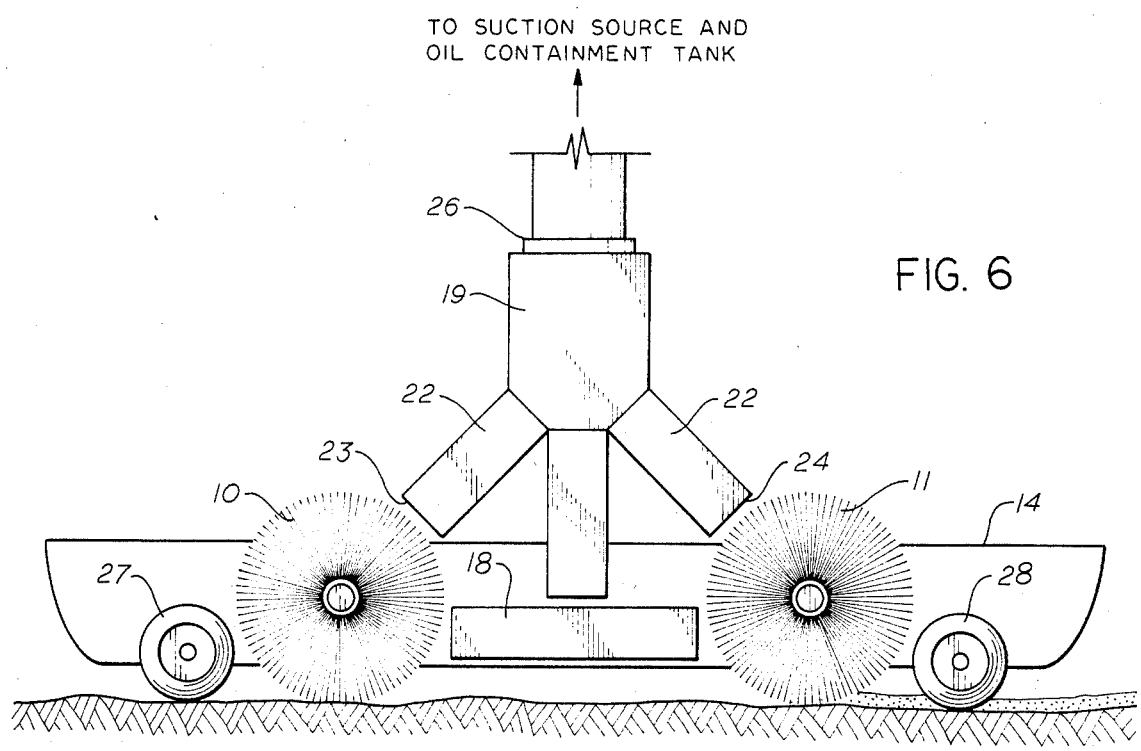
FIG. 6 is a side view of one embodiment of this invention where an amphibious apparatus is being employed to remove oil on land.

Preferably, the apparatus of this invention will be amphibious; that is, able to operate both at sea and on land. Apparatus 25 described above and illustrated in FIGS. 1, 2, and 3 could be made amphibious by, for example, employing wheels 27 and 28 on the support means 14, like the apparatus illustrated in FIG. 6. The apparatus of this invention can have a motor so that it can be driven on land or otherwise be self-propelled, or it can be pulled or pushed by another device such as a tractor. Similarly, at sea, the apparatus can be self-propelled or pulled or pushed by a boat. A portable version of the apparatus can be carried, pulled or pushed by a person or by light weight machinery.

The principle of the invention and the best mode contemplated for applying that principle have been described. It should be understood that the number, use and arrangement of the brushes, floatation means, and suction means according to the invention are not limited to the specific number, use and arrangements shown in the drawings. Other means and techniques can be employed without departing from the true scope of the invention defined in the following claims.

We claim:

1. An apparatus for removing oil on a surface that is not oleophilic, where such surface is a body of water, a subtidal sea floor, a riverbed, a shoreline, or a beach, comprising:
    a. at least one brush, that has flexible, oleophilic bristles, connected to a support means such that a lower portion of said brush is in contact with said oil and an upper portion of said brush is above said oil;
    b. a motor means for moving said brush such that oil is drawn into the brush; and
    c. a means for removing said oil from said brush, such means consisting essentially of a suction means positioned adjacent to said upper portion of said brush for removing said oil by suction from said brush.

2. The apparatus of claim 1 wherein said brush is cylindrical in shape and said moving of said brush is a rotating of said brush.

3. The apparatus of claim 1 wherein said support means can float on the surface of water.

4. The apparatus of claim 1 wherein said support means is capable of operation on a beach, shoreline, subtidal seafloor or riverbed.

5. The apparatus of claim 1 wherein the bristles of said brush are comprised of olefin polymer fibers that are resilient, bend easily without losing their shape, and resist breakage on impact.

6. The apparatus of claim 1 wherein the bristles of said brush are comprised of metal.

7. The apparatus of claim 1 wherein the bristles of said brush are comprised of plastic.

8. The apparatus of claim 1 wherein said brush is removable.

9. The apparatus of claim 1 wherein there are at least two brushes.

10. The apparatus of claim 9 wherein said brushes are positioned parallel between said support means in catamaran style.

11. The apparatus of claim 10 wherein said brushes rotate in opposite directions toward each other.

12. The apparatus of claim 10 wherein said brushes operate independently and may rotate together or in opposite directions toward or away from each other.

13. The apparatus of claim 10 wherein there is a sump area positioned between said brushes and a suction means to remove oil from said sump area.

14. The apparatus of claim 1 where said apparatus is amphibious and said support means is capable of operation on a beach or shoreline as well as floatation on the surface of a body of water.

15. An apparatus for removing oil floating upon a body of water comprising:
    a. at least two cylindrically shaped brushes that have flexible, oleophilic bristles and that are connected to a support means such that said brushes have a lower portion in contact with said oil and an upper portion above said water, said brushes being positioned parallel between said support means in catamaran style and said support means being capable of floatation;

b. sump area positioned between said brushes, c. motor means for rotating said brushes in opposite directions toward each other such that oil is drawn into the brushes and oil not picked up by the brushes is moved by hydrodynamic force to be deposited between the brushes in said sump area; and d. means for removing said oil from said brushes and said sump area, such means consisting essentially of a suction means positioned adjacent to said upper portion of said brushes and above said water.

16. The apparatus of claim 15 wherein said suction is by air conveyance and said body of water is in the Arctic.

17. An apparatus for removing submerged oil deposited upon a subtidal sea floor or riverbed beneath a body of water, comprising:

a. at least one brush having flexible, oleophillic bristles connected to a support means floating on the surface of said water;

b. a means for adjusting said brush so said brush may be positioned such that said brush has a lower portion in contact with said submerged oil for picking-up said oil;

c. a motor means for moving said brush such that oil is drawn into the brush; and d. a means for removing oil from said brush, said means consisting essentially of a suction means.

18. The apparatus of claim 17 wherein the height or diameter of said brush is greater than the depth of the water above said submerged oil, said suction means is positioned adjacent to the upper portion of said brush above said water, and said suction means is an air conveyance system.

19. The apparatus of claim 17 wherein said suction means is positioned adjacent to the upper portion of said brush and is a water pump.

20. An apparatus for removing submerged oil deposited upon the surface of a beach or shoreline, comprising:

a. at least one brush having flexible, oleophilic bristles connected to a support means such that said brush has a lower portion in contact with said oil and an upper portion above said oil;

b. motor means for moving the brush such that oil is drawn into said brush; and c. means for removing oil from said brush, said means consisting essentially of a suction means positioned adjacent to said upper portion of said brush.

21. The apparatus of claim 20 wherein said apparatus is capable of operating on a surface that is pebbly or rocky without substantially disturbing such surface.

22. The apparatus of claim 20 wherein said apparatus is capable of removing viscous oil or tar balls from wet sand on said surface without clogging and without removing substantial amounts of sand from said surface.

23. A method for removing oil from a surface that is not oleophilic, where such surface is a body of water, a subtidal seafloor, a riverbed, a shoreline, or a beach, comprising:

a. sweeping such surface with flexible, oleophilic bristles such that said oil is adsorbed on said bristles and drawn into the interstitial spaces between said bristles, and said bristles comprise at least one brush so that said sweeping of said surface may be easily controlled, and the removal of said oil thereby will be continuous and even without leaving behind streaks of said oil;

b. removing said oil from said bristles and said interstitial spaces between said bristles by a means consisting essentially of suction; and c. depositing said oil in a collection tank.

24. The method of claim 23 wherein said brush is cylindrical in shape and said sweeping of said surface is accomplished by rotating said brush.

25. The method of claim 24 wherein said rotating causes said oil not picked up by said bristles to be moved by hydrodynamic force and deposited in a sump area.

26. The method of claim 23 wherein said suction means is an air conveyor system.

* * * * *